(12) United States Patent
Park et al.

(10) Patent No.: US 7,531,236 B2
(45) Date of Patent: May 12, 2009

(54) POLARIZING COMPLEX WITH FUNCTIONAL LAYERS

(75) Inventors: Soo-An Park, Wonju (KR); Tae-Soo Lee, Wonju (KR); Sang-Soon Lee, Wonju (KR)

(73) Assignee: Korea O.G. K Co., Ltd., Gangwon-do (KR)

( * ) Notice: Subject to any disclaimer, the term of this patent is extended or adjusted under 35 U.S.C. 154(b) by 528 days.

(21) Appl. No.: 11/274,257

(22) Filed: Nov. 16, 2005

(65) Prior Publication Data

US 2006/0127677 A1    Jun. 15, 2006

(30) Foreign Application Priority Data

Dec. 15, 2004   (KR) .................. 10-2004-0106234
Dec. 15, 2004   (KR) .................. 10-2004-0106235

(51) Int. Cl.
*B32B 27/30*   (2006.01)
*B32B 27/36*   (2006.01)
*G02F 1/1335*  (2006.01)

(52) U.S. Cl. .................. 428/412; 428/500; 428/1.2; 349/96

(58) Field of Classification Search .................. 349/96; 428/412, 500, 1.2
See application file for complete search history.

(56) References Cited

U.S. PATENT DOCUMENTS

| 5,051,309 | A |   | 9/1991  | Kawaki et al. |
|-----------|---|---|---------|---------------|
| 5,827,614 | A | * | 10/1998 | Bhalakia et al. ........... 428/411.1 |
| 5,871,614 | A |   | 2/1999  | Turner |
| 6,671,031 | B1 |  | 12/2003 | Nishimura |
| 2002/0084023 | A1 | | 7/2002 | Yamamoto et al. |
| 2004/0096666 | A1 | * | 5/2004 | Knox et al. ................. 428/412 |
| 2005/0271873 | A1 | | 12/2005 | Kameyama et al. |

FOREIGN PATENT DOCUMENTS

| EP | 0 292 475 | 12/1994 |
| JP | 59-95503  | 6/1984  |

\* cited by examiner

*Primary Examiner*—Thao T. Tran
(74) *Attorney, Agent, or Firm*—Nixon & Vanderhye P.C.

(57) ABSTRACT

The present invention relates to a polarizing complex with functional layers, in particular a polarizing complex having a polarizing plate with lower retardation value and functional layers laminated thereon. Specifically, the present invention discloses a polarizing plate with a protecting layer of polycarbonate having lower retardation value and a polarizing complex including the polarizing plate and suitable layer(s) laminated thereon considering the use of the polarizing complex. The polarizing plate of the present invention comprises a polarizing film made of poly vinyl alcohol; a protecting layer made of poly carbonate; and functional layers, and characterized in that the poly carbonate has retardation value in the range of 5 to 250 nm.

7 Claims, 2 Drawing Sheets

US 7,531,236 B2

POLARIZING COMPLEX WITH FUNCTIONAL LAYERS

BACKGROUND OF THE INVENTION

1. Field of the Invention

The present invention relates to a polarizing complex with functional layers, in particular a polarizing complex having a polarizing plate with lower retardation value and functional layers laminated thereon.

Specifically, the present invention discloses a polarizing plate with a protecting layer of polycarbonate having lower retardation value and a polarizing complex including the polarizing plate and suitable layer(s) laminated thereon considering the use of the polarizing complex.

2. Description of the Background Art

In general, a polarizing plate may be utilized for manufacturing glasses, a goggle, a window blind, a sun-visor for a car and a LCD displays. The polarizing plate of the present invention may be preferably used for manufacturing glasses or the goggle. The polarizing plate may be generally used for anti-glare, and the polarizing plate may comprise a protecting layer or various functional layers. A method for producing a polarizing film included into the polarizing plate is known in this art, and for example the polarizing film may be manufactured by elongating poly vinyl alcohol (PVA) or poly ethylene terephthalate (PET) along an axe after dye, or absorption of iodine or a dichromatic color.

The known materials for use of the protecting layer may be in the form of resin sheet or film and the resin sheet may comprise tri-acetyl cellulose, acrylic resins, poly esters, poly amides, poly urethanes or poly carbonates. In particular, poly carbonate is preferable for use of optical wares such as glasses, goggles and sun-glasses because poly carbonate have excellent flexibility and workability as well as excellent impact resistance, thermal resistance, wear resistance and transparency. However, compared to other transparent materials, polycarbonate is known as having some problem with the polarized light owing to the color interference fringe or optical distortion which may cause asthenopia of eye or a headache even though it has no problem with ordinary light.

Furthermore, a curve-machining development for lens structure may cause the color interference to increase. And also it is known that poly carbonate with high retardation value may have poor solvent resistance in the adhesion process resulting to cracking phenomenon after manufacturing. Hence it may be difficult to obtain a polarizing plate with uniform surface.

U.S. Pat. No. 5,051,309 entitled as "Anti-Dazzling Polycarbonate Polarizing Plate" discloses a polarizing plate using poly carbonate as a protecting layer of a polarizing film. The above invention utilizes a poly carbonate sheet as protecting layer instead of tri-acetyl cellulose sheet, acrylic sheet, poly ester sheet, poly amide sheet or poly urethane sheet. The color interference fringe from the poly carbonate sheet can be diminished by using a poly carbonate sheet with retardation value more than 2000 nm. And also the polarizing plate of the above invention is treated with boric acid in the presence of metal to enhance the polarization and durability.

As prior art relating to a polarizing plate, JP publication No. 95503/1984 suggests a method that a film of poly vinyl alcohol is dyed bi-chromatic color and then treats it with boric acid after elongation and heat-treatment under tension.

No prior invention discloses a method that a polarizing film of poly vinyl alcohol is produced in the absence of metal ions and then a protecting film of poly carbonate with lower retardation value may be laminated thereon as a protecting layer.

Therefore the present invention discloses a polarizing plate that no metal ion is used in the manufacturing process and a poly carbonate sheet with retardation as much as 10 nm is laminated on a polarizing film of poly vinyl alcohol sheet.

On the other hand a polarizing complex is a material comprising a polarizing plate and functional layers laminated on the polarizing plate, and may be used for manufacturing glasses or a goggle.

As a conventional invention relating to the complex, US publication No. 2002/84023 entitled as "A polarizing compact and a method for producing the same" describes a polarizing complex for overcoming disadvantage of the known invention. The purpose of the above invention is to resolve the problem that a polarizing glass lens sheet whose both sides are coated with glass is devoid of workability and the capability of polarization can decrease on casting the polarizing plastic lens owing to contraction of the polarizing film sheet and heat decomposition. The above invention coats at least one surface of the polarizing compact with at least one functional surface machining film for enhancing the functionality.

In addition, U.S. Pat. No. 5,871,614 entitled as "Production of Optical Elements" discloses a polarizing complex. The above invention is characterized in that a first thermoplastic resin sheet is fixed on a power portion and then functional portions are laminated thereon. The functional portions may have optical properties relating to photochromism, polarization, hardness, ware resistance, chemical resistance, color shadow, coloration, adornment, index and the like.

No known invention disclose advantage of a protecting layer or sheet having peculiar optical property. The protecting layer with peculiar optical property may enhance the functionality of the polarizing complex. The polarizing complex may comprise various functional layers and it is possible to take advantages such as improvement of a desired property, the simplicity of the manufacturing process and the lower expense for producing by using special layers with peculiar optical properties.

SUMMARY OF THE INVENTION

It is one object of the present invention to provide a polarizing plate comprising a protecting layer of poly carbonate with lower retardation value, wherein the polarizing plate may have excellent workability and polarization.

The polarizing plate of the present invention may be produced by a method comprising; swelling a poly vinyl alcohol (PVA), dying the poly vinyl alcohol, immersing the dyed poly vinyl alcohol into a solution and laminating a protecting layer on the polarizing film of poly vinyl alcohol. In the immersing step, the poly vinyl alcohol may be immersed into a boric acid solution of 3 to 7 wt %. And a poly carbonate (PC) having retardation value in the range of 5 to 250 nm may be used as the protecting layer.

It is other object of the present invention to provide a polarizing complex comprising a protecting layer of poly carbonate having retardation value of 5 to 250 nm and functional layers having desired optical properties.

The polarizing complex of the present invention may comprise a polarizing sheet, a protecting layer and functional layers. The polarizing complex may be in the thickness of 0.3 mm to 0.8 mm and may be produced by the method comprising the steps of laminating a protecting layer of a thermoplastic resin such as poly carbonate on a polarizing film and laminating functional layers on the protecting layer. The functional layers may comprise an optical chromatic material for shielding ultra-violet light or comprise a composite dye for shielding light in the range of 420 nm to 480 nm—wavelength corresponding to blue, and the functional layers may be in a single form with the protecting layer or in a separating layer from the protecting layer.

According to one aspect of the present invention, the polarizing complex may comprise a polarizing film made of poly vinyl alcohol, a protecting layer made of poly carbonate, and functional layers, wherein the poly carbonate has retardation value in the range of 5 to 250 nm.

According to other aspect of the present invention, the protecting layer may be laminated on both sides of the polarizing film and the thickness of each layer may be different from each other.

According to another aspect of the present invention, the thickness of the protecting layer is 0.1 to 1.0 mm.

According to further aspect of the present invention, the polarization of poly carbonate may be more than 90%.

According to still further aspect of the present invention, at least one layer among the functional layers may be for shielding ultra-violet light.

According to still further aspect of the present invention, the least one layer may comprise an agent for shielding ultra-violet light.

According to still further aspect of the present invention, at least one layer among the functional layers may be for shielding the wavelength corresponding to blue in visible light.

According to still further aspect of the present invention, the at least one layer may comprise a mixed dye or a shielding agent.

According to still further aspect of the present invention, the functional layers may comprise spiro-naphthoxazines, napththopyrans, $Ni(OH)_2$ or $TiO_2$.

According to still further aspect of the present invention, at least one functional layer may be incorporated in single layer with the protecting layer.

BRIED DISCRIPTION OF THE DRAWINGS

DETAILED DESCRIPTION OF THE INVENTION

The present invention will be explained in detail in the following with examples not limiting the scope of the present invention. And the description for known or obvious particulars will be left out or made simple not for exclusion, but for clarity and good comprehension.

The term "a polarizing film or a polarizing film sheet" means a base film of a polarizing plate herein. And also the term may include the polarizing plate if necessary. Therefore the term will be used inclusively for convenience of explanation herein. But if there is a chance that some confusion happens, the term will be distinguished from the polarizing plate.

Figure 1:
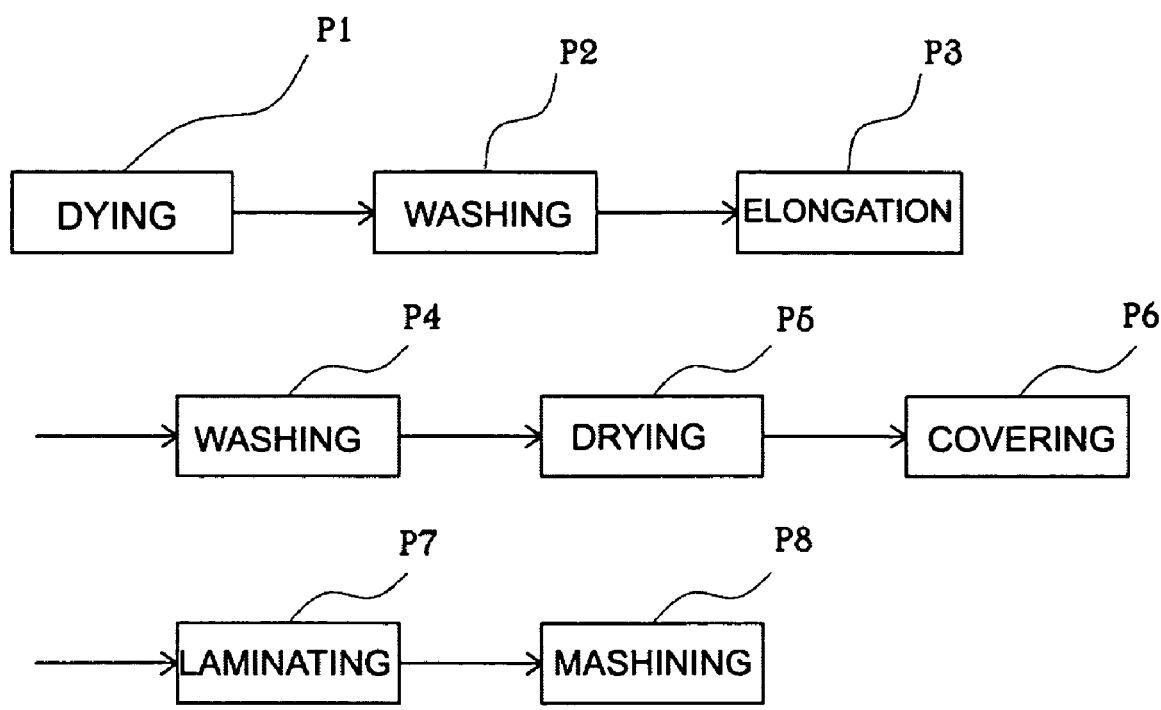
FIG. 1 shows block diagram representing the manufacturing process of the polarizing plate according to the present invention.

FIG. 1 shows a method for manufacturing a polarizing plate according to the present invention.

Referring to FIG. 1, a polarizing film sheet may be dyed with dichromatic material for producing a polarizing plate (P1). The polarizing film sheet may be made of poly vinyl alcohol (PVA), poly ethylene terephthalate (PET) or any other known material, but poly vinyl alcohol may be preferable. The thickness of the polarizing film sheet may be 35 to 90 μm, and preferably about 75 μm. For exemplary material of the polarizing film sheet poly vinyl alcohol (PVA) available from Kuraray Company Ltd, Japan and having 1700 polymerization degree and 75 μm thickness may be used.

The polarization degree of the polarizing plate according to the present invention has to be more than 90%, and preferably more than 95%.

The polarization degree is estimated as the following equation: Polarization degree (%)=$[(HP-HT)/(HP+HT)]*100$, where HP represents the magnitudes of light penetrating two film layers whose molecular structures are parallel each other, while HT represents the magnitudes of light penetrating two film layers whose molecular structures are perpendicular each other.

Poly vinyl alcohol (PVA) is swollen into water at 30 to 50° C. before being dyed for uniformity and easiness of dye (P1). And then the swollen PVA may be dyed in the urea-absorption method or the dye-absorption method. For producing the polarizing film to be utilized for the polarizing plate according to the present invention, the dye-absorption method was used and PVA was immersed into an aqueous solution of a gray or brown dichromatic color for about 10 minutes to be dyed. The aqueous solution was kept at the same temperature of 30 to 50° C. as that of water for swelling. PVA may be dyed dichromatic material in the known method.

The dyed PVA may be washed (P2). PVA may be washed with distilled water or acetone in the known method.

The dyed and washed PVA is under an elongation process (P3). The elongation process may include substantially an immersion and elongation process in a boric acid solution. The boric acid solution used for producing the polarizing plate of the present invention may be in 3 to 7 wt %, preferably about 5 wt %, and the time and temperature into the boric acid solution may be 3 to 8 minutes, preferably about 5 minutes and 30 to 50° C., respectively. In general, the immersion into the boric acid solution can be performed for cross-linking the aqueous PVA, and hence the elongation may be advantageously performed together with the immersion. The elongation may be in 3 to 8 times, preferably 5 times along the direction of axe. In addition, an elongation along vertical direction of axe may be preformed together with the elongation of axe. The vertical elongation may be about one times for improving the strength of the polarizing film. The elongated sheet may be washed with water (P4). The polarizing film may be obtained through drying at the temperature of 60 to 80° C. for about 5 minutes (P5) after washing (P4). The produced polarizing film can be used for producing a polarizing plate.

The method for producing the polarizing plate according to the present invention may comprise the step of laminating protecting layers on both sides of the polarizing film produced by the above-mentioned method. The protecting layer may comprise tri-acetyl celluloses, acryl, poly esters, poly amides, poly urethanes and poly carbonates, but the poly carbonates may be preferably used. In addition, the retardation value of poly carbonates used for producing the polarizing plate of the present invention may be in the range of 5 to 250 nm, preferable 30 to 180 nm.

The retardation value may be estimated as the following equation: Retardation Value (nm)=$\Delta n*d$, where $\Delta n$ represents the birefringence and d represents the thickness in nm.

For example, poly carbonate used as the protecting layer of the present invention has 150 to 178 nm retardation value if the wavelength of the incoming light is 633 nm and the thickness of the polarizing plate is 0.8 nm, while 30 to 40 nm if the thickness is 0.3 nm with the same wavelength.

A poly carbonate with such lower retardation value can be produced through a peculiar process to reduce the optical phase difference. The peculiar may be, for example, some process to remove non-uniformity of orientation through elongation or non-uniformity of poly carbonate surface with temperature fluctuation. The non-uniformity may be caused by the temperature difference between the inside and surface of poly carbonate, and the temperature variation from site to site on ploy carbonate, and therefore it is necessary to perform the elongation under constant temperature on the whole. Furthermore it may be desirable to cool poly carbonate at slow rate for long time.

For keeping constant temperature, the poly carbonate may be illuminated with ultra-red light or the temperature of the boric acid solution may be made to increase slowly during elongation. And for cooling at slow rate, poly carbonate may be cooled within a temperature-adjusted container. Poly carbonate with lower retardation value can be obtained by adding the above-mentioned steps in manufacturing process.

Poly carbonate with lower retardation value produced by the above mentioned method has permeability more than 90% in the range of visible wavelength, in particular approximately in the wavelength of 430, 550 and 630 nm. The poly carbonate adhesion on both sides of the polarizing film may comprise a step of spreading (P6) an adhesive on one side of poly carbonate with Roller Coater after removing a protecting film. The adhesives may preferably have lower optical anisotropy and may comprise isocyanates, poly urethanes and epoxies. The thickness of the adhesion may be 2 to 80 μm. The adhesion may be spread by a known method such as Reverse Roll Coating, Gravure Coating, Bar Coating or Offset Coating, and the poly carbonate spread with the adhesion may be dried into a dryer for about 5 minutes and then laminated on both sides of the polarizing film (P7).

The polarizing plate including the polarizing film and the poly carbonate laminated on the polarizing film may be matured under constant temperature and moisture, and then machined on the surface by a known method for use such as glasses, a goggle and the like (P8).

The polarizing plate of the present invention has aspect that poly carbonate with the lower retardation value is laminated on both sides of the polarizing film as a protecting layer.

Figure 2:
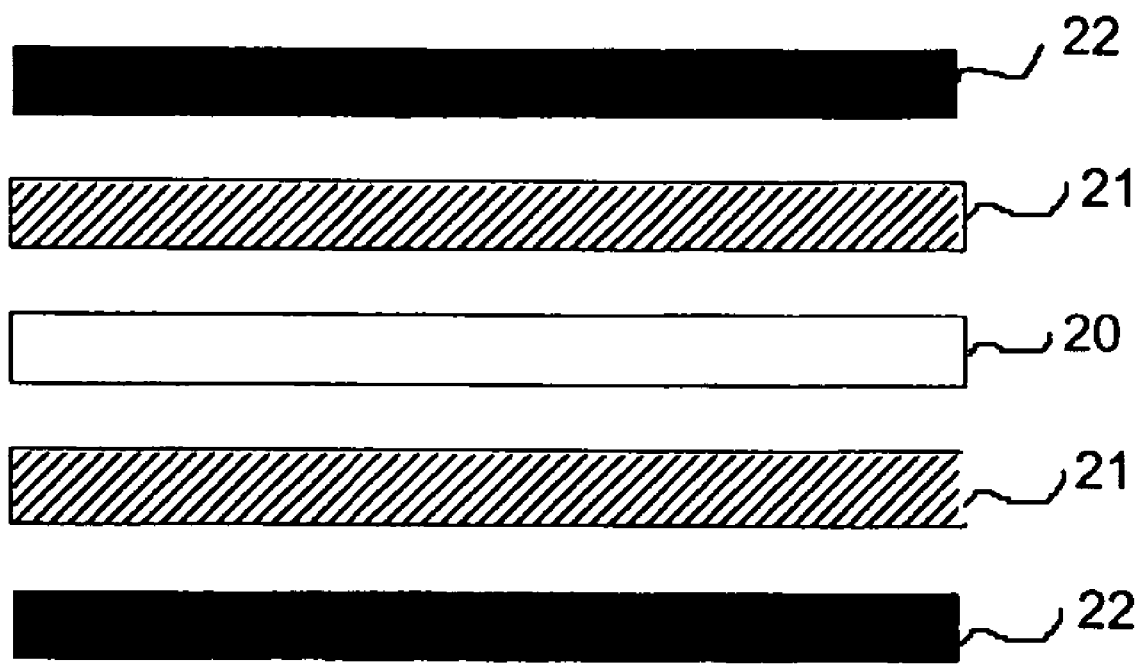
FIG. 2 shows a cross sectional view of the polarizing complex according the present invention.

FIG. 2 shows the cross-sectional view of a polarizing complex 2 according to the present invention.

Referring to FIG. 2, the polarizing complex 2 may comprise a polarizing film 20, protecting layer 21 and functional layers 22. The polarizing film 20 may be made of, for example, poly vinyl alcohol (PVA). The method for producing the polarizing film 20 with PVA was explained in detail in the above example using FIG. 1.

After the polarizing film is produced, the polarizing plate with the above-mentioned properties can be obtained by laminating poly carbonate on the polarizing film. And then functional layers 22 may be laminated on the polarizing plate considering the use of the polarizing complex. The functional layers 22 is added to the polarizing plate for the desired optical properties such as photochromic, hard-coating, anti-fog, anti-reflection, anti-glare, mirror-coating or anti-static. These functional layers 22 may laminated in a single layer or in separate each layer. For example, a dye capable of selectively reflecting a certain range of wavelength may be coated on the poly carbonate layer or the dye may be mixed on the poly carbonate layer in a certain magnitude during manufacturing the protecting layer of poly carbonate. Poly carbonate itself has some properties such as thermal endurance, workability and hardness, and therefore the functional layers used for the polarizing plate of the present invention may be preferably in the purpose of photochromic or anti-reflection. In particular, the poly carbonate layer of the present invention has the thickness for durability and hardness as well as lower retardation value, and therefore the functional layer for durability and hardness advantageously is not required. This may be in favor of the thickness of the polarizing complex.

The functional layers 22 may preferably comprise organic photochromic material such as spiro-naphthoxazines or naphthopyrans or inorganic photochromic material such as $Ni(OH)_2$ or $TiO_2$.

Ultra-violet light may be blocked by laminating a thin shielding film on the poly carbonate layer and preferably by mixing a dye or chromatic material with the poly carbonate layer. If the film for blocking ultra-violet light is laminated, the workability and durability of the polarizing complex may be worse owing to the film. Therefore, the dye may be preferably used for shielding the ultra-violet light. The dye may be spread on the poly carbonate layer forming thin layer or the dye may be mixed with the solution for producing the poly carbonate layer. In addition, poly carbonate may be dyed and then the dyed poly carbonate may be laminated on the polarizing film as a protecting layer. As example of using photochromic, a photochromic material may be used in a manner that the material is colored on exposing to strong light and the material is changed into transparent on exposing to weak light or in the dark. For use of the photochromic, the material is mixed in the process of manufacturing the protecting layer 21, and thereby additional process for covering or coating the layer with a dye or dying the layer is not advantageously required for shielding ultra-violet light. The benefit of the photochromic material is to make the thickness of the produced polarizing complex thinner. The photochromic material may comprise organic material such as spiro-naphthoxazine and naphthopyran or inorganic material such as $Ni(OH)_2$ and $TiO_2$. These photochromic materials may be mixed with poly carbonate or an adhesive agent in the manufacturing process.

A wavelength corresponding to blue in visible light may be shielded by mixing a suitable material with the protecting layer or covering the protecting layer with the material. The method for mixing or covering is similar to that for shielding ultra-violet light.

The functional layers 22 may comprise films for chemical-resistance, anti-contamination or water-proof, but poly carbonate itself has properties for avoiding such deterioration. Hence the films may be used for supplementing the desired function. On the other hand the protecting layer made of poly carbonate with a suitable thickness may have a retardation value at which the interference of light doesn't occur. Therefore, the protecting layer of poly carbonate can reduce the necessity of such films.

In general, a protecting layer 21 of the present invention may be laminated on both sides of a polarizing sheet, and functional layers 22 may be formed in a single layer together with the protecting layer or in a separate layer which is covered on the protecting layer or laminated in a film. However, the protecting layer may be laminated only on one side if necessary. And also the thickness of each protecting layer is different from each other even though the protecting layer is laminated on both sides of the polarizing film. And also the functional layers may be incorporated with an adhesive agent in a single form.

The polarizing plate according to the present invention has small retardation value and thereby the interference of light and the optical distortion can be avoided. And also the present invention can provide a polarizing plate which has excellent chemical resistance such as anti-crack and thereby has good efficiency. And the present invention may provide a polarizing plate which has excellent optical aspects, workability, thermal resistance and durability corresponding to the aspects of poly carbonate.

The polarizing complex comprising the above-mentioned aspects may give advantage that the durability and workability of the polarizing film can be improved and the interference can be significantly reduced. Furthermore, by shielding a predetermined wavelength such as the wavelength corresponding to ultra-violet or blue light, the polarizing complex may reduce the damage of vision effectively.

The polarizing complex comprising a protecting layer and functional layers according to the present invention was described in detail using examples. The examples are for the clear understanding of the invention not limiting the scope of the present invention.

The invention claimed is:

1. A polarizing complex comprising,
a polarizing film made of poly vinyl alcohol;
a protecting layer 0.1 to 1.0 mm thick and made of poly carbonate; and
functional layers wherein at least one layer among the functional layers is for shielding ultra-violet light,
wherein the poly carbonate has retardation value measured according to the equation $\Delta n * d$ where $\Delta n$ represents the birefringence and d represents the thickness in nm in the range of 5 to 250 nm, and
the permeability of poly carbonate in the range of visible light is more than 90%.

2. The polarizing complex according to claim 1, wherein the protecting layer is laminated on both sides of the polarizing film and the thickness of each layer is different from each other.

3. The polarizing complex according to claim 1, wherein the at least one layer comprises a ultra-violet agent.

4. The polarizing complex according to claim 1, wherein at least one layer among the functional layers is for shielding the wavelength corresponding to blue in visible light.

5. The polarizing complex according to claim 4, wherein the at least one layer comprises a mixed dye or a shielding agent.

6. The polarizing complex according to claim 1, wherein the functional layers comprise spiro-naphthoxazines, naphthopyrans, Ni(OH).sub.2 or TiO. sub.2.

7. A polarizing complex comprising,
a polarizing film made of poly vinyl alcohol;
a protecting layer 0.1 to 1.0 mm thick and made of poly carbonate; and
functional layers including at least one layer for shielding the wavelength corresponding to blue in visible light,
wherein the poly carbonate has retardation value measured according to the equation $\Delta n * d$ where $\Delta n$ represents the birefringence and d represents the thickness in nm in the range of 5 to 250 nm, and
the permeability of poly carbonate in the range of visible light is more than 90%.

* * * * *